US006948164B2

(12) United States Patent
Tinker

(10) Patent No.: US 6,948,164 B2
(45) Date of Patent: Sep. 20, 2005

(54) METHOD AND SYSTEM FOR MODIFYING EXECUTABLE CODE TO ADD ADDITIONAL FUNCTIONALITY

(75) Inventor: Jeffrey L. Tinker, Kenmore, WA (US)

(73) Assignee: Metrowerks Corporation, Austin, TX (US)

( * ) Notice: Subject to any disclaimer, the term of this patent is extended or adjusted under 35 U.S.C. 154(b) by 278 days.

(21) Appl. No.: 10/369,225

(22) Filed: Feb. 18, 2003

(65) Prior Publication Data

US 2003/0212983 A1 Nov. 13, 2003

Related U.S. Application Data

(63) Continuation of application No. 09/212,182, filed on Dec. 14, 1998, now abandoned.

(51) Int. Cl.⁷ .................................... G06F 9/44
(52) U.S. Cl. ........................ 717/168; 717/163
(58) Field of Search ................. 717/168, 163

(56) References Cited

U.S. PATENT DOCUMENTS

| 4,802,165 A | 1/1989 | Ream ............................ 371/19 |
| 5,155,847 A | 10/1992 | Kirouac et al. .............. 395/600 |

(Continued)

FOREIGN PATENT DOCUMENTS

| EP | 0 853 278 A2 | 7/1998 |
| JP | 63-317826 | 12/1988 |
| JP | 5-88880 | 4/1993 |
| JP | 5-241813 | 9/1993 |
| JP | 7-114487 | 5/1995 |

OTHER PUBLICATIONS

Beginning Visual C++ 5, Ivan Horton, pp. 715–734, Mar. 19, 1997.*

Wall, David W., "Systems for Late Code Modification," WRL Research Report 92/3, May 1992, pp. 1–24.

(Continued)

Primary Examiner—Todd Ingberg
(74) Attorney, Agent, or Firm—Andrews Kurth L.L.P.

(57) ABSTRACT

A system for modifying a compiled executable code file by adding patches that add functionality when the modified executable code file is executed. The modifying is performed without recompiling, relinking or rewriting the code file. Adding a patch involves creating a patch handler which when executed causes the patch statements to be executed, and may involve replacing one or more existing compiled instructions in the file with patching instructions to transfer flow of execution to the appropriate patch handler. The instructions replaced by the patching instructions can also be added to the patch handler. Patches can also include code statements which form a complete module, such as an invokable routine, which can be referenced by other patch statements to cause the module to be executed. Specialized trace requests can also be added as patch statements. The trace requests will make specified information about the current execution of the executable code file available to a software developer. Patch statements can include variables and expressions that will be evaluated in the context of the appropriate current variable scope, regardless of whether the scope is defined within the patch or by existing compiled instructions. After patches have been added, they can be disabled so as to prevent their execution without removing the patching instructions from the compiled executable file. Patches can also be qualified with conditions such that the patch will be executed only when the conditions are true at the time of execution.

75 Claims, 9 Drawing Sheets

U.S. PATENT DOCUMENTS

| | | | |
|---|---|---|---|
| 5,335,344 A | 8/1994 | Hastings | 395/575 |
| 5,450,586 A | 9/1995 | Kuzara et al. | 395/700 |
| 5,481,713 A | 1/1996 | Wetmore et al. | 395/705 |
| 5,535,329 A | 7/1996 | Hastings | 714/35 |
| 5,577,244 A | 11/1996 | Killebrew et al. | 395/703 |
| 5,583,761 A | 12/1996 | Chou | 707/536 |
| 5,619,698 A | 4/1997 | Lillich et al. | 395/710 |
| 5,694,566 A | 12/1997 | Nagae | 395/401 |
| 5,699,275 A | 12/1997 | Beasley et al. | 364/514 R |
| 5,764,992 A | 6/1998 | Kullick et al. | 395/712 |
| 5,790,856 A | 8/1998 | Lillich | 395/703 |
| 5,812,848 A | 9/1998 | Cohen | 709/305 |
| 5,960,196 A | 9/1999 | Carrier, III et al. | 395/701 |
| 6,075,937 A | 6/2000 | Scalzi et al. | 395/500.44 |
| 6,113,652 A | 9/2000 | Lysik et al. | 717/11 |
| 6,123,737 A | 9/2000 | Sadowsky | 717/11 |
| 6,141,698 A | 10/2000 | Krishnan et al. | 709/331 |
| 6,161,218 A | 12/2000 | Taylor | 717/11 |
| 6,898,788 B2 * | 5/2005 | Kosaka et al. | 717/162 |

OTHER PUBLICATIONS

Wall, David W., "Link–Time Code Modification," WRL Research Report 89/17, Sep. 1989, pp. 1–17.

Keppel, David, "Fast Data Breakpoints," May 3, 1990, revised Apr. 14, 1993, pp. 1–6.

Kessler, Peter B., "Fast Breakpoints: Design and Implementation," Jun. 1990, pp. 78–83.

Olsson, Ronald A.. et al., "Dalek: A GNU, Improved Programmable Debugger," USENIX Summer Conference, Jun. 1990, pp. 221–230.

Larus, James R., and Ball, Thomas, "Rewriting Executable Files to Measure Program Behavior," Mar. 1992, pp. 1–17.

Aho et al., "Compilers Principles Techniques and Tools," Chapters 1–5, 1985.

IBM, "Dual Indirect RAM/ROM Jump Tables for Firmware Updates," Jun. 1988, pp. 294–298.

* cited by examiner

FIG. 2A

| |
|---|
| ⋮ |
| Instr N <a=a+c> |
| Instr N+1 <If a>20> |
| Instr N+2 <Then Call FN 1(a)> |
| Instr N+3 <Else a=0> |
| Instr N+4 <End If> |
| Instr N+5 <While b<>0> |
| Instr N+6 <Print "b=", b> |
| Instr N+7 <End While> |
| ⋮ |
| FN1(X) |
| Instr P <If Time( )="PM"> |
| Instr P+1 <Then Print "Temp High:", x> |
| Instr P+2 <End If> |
| Instr P+3 <RETURN> |
| ⋮ |

FIG. 2B

| |
|---|
| ⋮ |
| PATCH 1 |
| Instr N+1 |
| Instr N+2 |
| PATCH 2 |
| Instr N+4 |
| Instr N+5 |
| PATCH 3 |
| Instr N+7 |
| ⋮ |
| FN1(X) |
| PATCH 4 |
| Instr P+1 |
| Instr P+2 |
| Instr P+3 |
| ⋮ |

Patch Handler PATCH 1

| |
|---|
| <save state> |
| Trace "Trace: Patch1" |
| Instr N |
| <restore state> |

Patch Handler PATCH 2

| |
|---|
| <save state> |
| Trace "Trace A:", a |
| ELSE a=1 |
| <restore state> |

Patch Handler PATCH 3

| |
|---|
| <save state> |
| b=b-1 |
| call Fn2(b) |
| Instr N+6 |
| <restore state> |

Patch Handler PATCH 4

| |
|---|
| <save state> |
| Trace "Fn1", x |
| Trace "Global Y =", y |
| Instr P |
| <restore state> |

| |
|---|
| FN2(X) |
| Instr M <if y = TRUE> |
| Instr M+1 <Then Print "Fn2:", x> |
| Instr M+2 <RETURN> | a = a + (b * 3)

Function Swap (Ptr C, Ptr D)
  Global X = Value at Ptr C
  Value at Ptr C = Value at Ptr D
  Value at Ptr D = Global X
RETURN

METHOD AND SYSTEM FOR MODIFYING EXECUTABLE CODE TO ADD ADDITIONAL FUNCTIONALITY

TECHNICAL FIELD

The present invention relates generally to efficiently creating executable software, and more particularly to modifying compiled executable files to add additional functionality.

BACKGROUND OF THE INVENTION

In the past, creating executable software code could be a time-consuming task. The typical code creation process involved first creating a source code program (i.e., a series of lines of program statements in a high-level computer language) with a text processing program, compiling and linking the source code (sometimes with an intermediate assembling step) to create executable code (i.e., a series of machine language instructions) for a specified computer processor, and then storing the executable code in an executable file. The executable code could then be debugged by executing the executable file on the specified computer processor to determine if the software performed its task correctly, or if instead it had one or more errors (i.e., bugs). If the executable code had errors, a software developer would modify the source code in an attempt to remove the errors, recompile the source code, and then link the recompiled code to produce a new executable file for debugging. For large software programs, this process was iteratively performed a large number of times until all known errors were removed.

In many cases, the cause of an error (e.g., a mistake in the program logic) is not obvious from executing the executable file. Various options existed for a software developer to identify errors. For example, a software developer could add print statements throughout the source code so that as the corresponding executable print instructions are executed (after compiling and linking), they would report the current progress of the execution. Knowledge of the current execution progress assists in identifying the section of the code which was executing when an error occurred. In addition to merely reporting execution progress, print statements can also display the current value of variables or source code expressions at specified points throughout the execution. Since the print statements were part of the original compilation/linking process, the variables and expressions that were part of the print statements would be evaluated in the context of the current variable scope (e.g., using the value of a local variable in a currently executing function rather than a variable with the same name in a different non-executing function), as would any other compiled code statement.

In addition to print requests, application programs known as debuggers were developed to provide additional control over execution of executable files. A debugger loads executable code into memory and then controls execution of the executable code. For example, the debugger can execute a single executable code instruction at a time. Alternately, the debugger can execute the executable code continuously until a break point designated within the debugger is reached. Such debuggers can also use additional information stored in an executable code file during the compiling and linking steps to reconstruct and display the source code lines that correspond to the instructions in the executable code. The display of the source code facilitates control by the software developer of the execution of the executable code (e.g., setting a breakpoint at a particular point in the source code). When execution of the executable code is stopped, a user can interact with the debugger to view current values of variables and expressions. In addition, some debuggers allow a user to view the effects of temporarily modifying a source code line. Nonetheless, although such debuggers can assist with locating errors in executable compiled code, recompiling and linking is needed to fix errors that are located.

In addition to the use of debuggers, other techniques have been developed to modify the functionality of compiled code without requiring a full recompilation and linking. One technique involves relinking previously compiled code with different code than was previously used for linking (e.g., using an updated Dynamic-Link Library or replacing a stubbed routine with a functional routine). In this situation, no changes are made to the previously compiled code, but changes in the overall program functionality can occur due to the different operation of the newly linked code. However, this technique is not typically useful in modifying errors in the compiled code (since the compiled code is not changed) or in flexibly adding functionality to an executable file at a desired user-specified location (since only previously specified link points can be used for the relinking).

Another technique to modify the functionality of compiled code without requiring recompilation and linking involves rewriting an executable file. Rather than modifying an existing file, rewriting involves creating an entirely new executable compiled file based on an existing executable file. Rewriting an executable file does allow new functionality to be added to an executable file at a user-specified location because new compiled instructions can be added to the new file. However, rewriting is difficult to perform without adding errors into the new file, and the specific mechanisms for adding instructions (e.g., adjusting offsets in existing instructions) typically vary on each type of processor.

When executable code is being created for an embedded system (e.g., an embedded controller for manufacturing equipment), the problems with software code creation are exacerbated. Such embedded systems may include only a CPU and memory, without having access to other standard computer system components such as a keyboard or display. In addition, standard application programs such as text processors and debuggers may not be available for an embedded system. In this environment, the source code will typically be created on a host computer system separate from the embedded target system. This allows a user application such as a text processor to create the source code. The source code is then compiled for the target embedded computer system and transferred (e.g., over a network) to the embedded system for execution and debugging. When an error occurs during execution of the executable code on the embedded system, the lack of standard computer system components and application programs on the target system make it extremely difficult to determine the cause of the error. Even obtaining information about the current state of the execution at the time of the error is typically difficult. Moreover, even if such information is available, it will need to be transferred back to the host computer system where modifications to the source code can begin another compile/link/transfer/debug cycle.

SUMMARY OF THE INVENTION

In accordance with one aspect of the present invention, a method and system are provided for modifying a compiled executable code file so as to add functionality when the modified executable code file is executed. The modifying of the executable code file is performed without recompiling, relinking or rewriting the executable code file. In particular, the system allows a user to indicate changes to be made to the compiled executable file, including adding code statements to the compiled executable file and manipulating previously added code statements in a variety of ways. Each set of code statements which are to be added is referred to as a patch, with each statement in a patch being referred to as a patch statement. After the patches have been specified, the system modifies the compiled executable code in a non-transitory manner such that the patch statements will be performed when the modified executable code is executed in the future. This manner of modification allows the traditional compile/link/debug cycle to be avoided, thus providing significant time savings.

Adding a patch to a compiled executable code file involves creating a patch handler which when executed causes the patch statements to be executed and which may additionally perform various housekeeping functions. The patch statements may be stored in an executable machine-independent non-compiled format, and if so are interpreted when executed on a target computer. Adding a patch may also involve replacing one or more existing compiled instructions in the compiled executable code file with patching instructions which, when executed, will transfer flow of execution to the appropriate patch handler loaded in memory. When a patch is intended to be executed in addition to the existing compiled instructions (rather than substituting for one or more instructions), the existing instructions replaced by the patching instruction can be added to the patch handler so that they will be executed in addition to the patch statements. The patching instructions can directly identify the memory location of a patch handler, such as with a transfer instruction. Alternately, the patching instructions can include a unique reference to the appropriate patch handler, and if so the appropriate memory location for the referenced patch handler will not be determined until the time of execution. Patches can also include code statements which form a complete module, such as an invokable routine, which can be referenced by other patch statements to cause the module to be executed. In addition, patch statements can include variables and expressions that will be evaluated in the context of the appropriate current variable scope, regardless of whether the scope is defined within the patch or by existing compiled instructions. Finally, specialized trace requests can also be added to the compiled executable code as patch statements. The trace requests will make specified information about the current execution of the executable code file available to a software developer, such as by storing it on a local trace log file or transmitting it electronically. After patches have been added, they can be disabled so as to prevent their execution without removing the patching instructions from the compiled executable file. Patches can also be qualified with conditions such that the patch will be executed only when the conditions are true at the time of execution.

In accordance with one aspect of the present invention, the system modifies on a target computer a compiled file executable on the target computer, with the compiled file including a plurality of compiled instructions. The modifying is performed under control of a source computer, and it involves first loading the compiled file onto the target computer and then receiving an indication to modify the compiled file by adding at least one instruction to be executed upon execution of the compiled file. The system then creates a patch group having instructions including the indicated instructions. The system then modifies the compiled file on the target computer by replacing an instruction in the compiled file with a patch instruction, and loads the patch group into a portion of memory on the target computer distinct from the memory in which the compiled file is loaded. The system then executes on the target computer the instructions in the modified compiled file by, when an instruction to be executed is the patch instruction, indicating one of the plurality of instructions in the loaded patch group as a next instruction to be executed.

BRIEF DESCRIPTION OF THE DRAWINGS

FIGS. 2A and 2B illustrate an example of patched software code.

DETAILED DESCRIPTION OF THE INVENTION

An embodiment of the present invention provides a method and system for modifying a compiled executable code file so as to add functionality when the modified executable code file is executed. The modifying of the executable code file is performed without recompiling, relinking or rewriting the executable code file. In particular, the Code Patcher system loads compiled executable code into memory on a target computer, and allows a user to indicate patches to be made to the compiled executable file. These patches can include adding code statements (i.e., compiled instructions or lines of source code) to the compiled executable file. In one embodiment, the source code lines corresponding to the compiled executable instructions in the file can be shown, and the user can indicate the changes to be made in the displayed source code. After the patches have been indicated, the Code Patcher system modifies the compiled executable code in a non-transitory manner such that the patches will be performed when the modified executable code is executed in the future. This manner of modification allows the traditional compile/link/debug cycle to be avoided, thus providing significant time savings.

Figure 1:
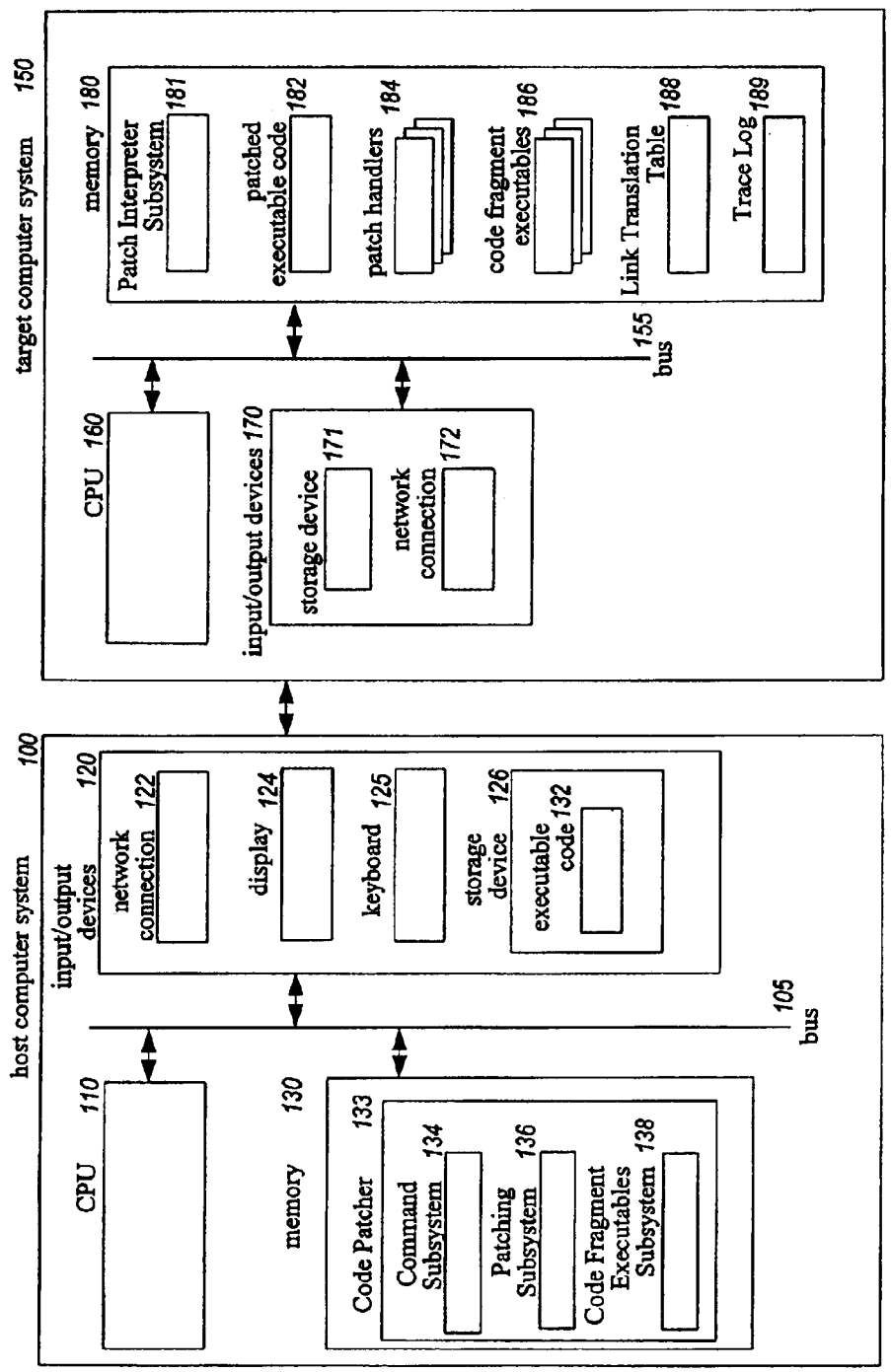
FIG. 1 is a block diagram illustrating an embodiment of the Code Patcher system of the present invention.

FIG. 1 illustrates an embodiment of a Code Patcher system 133 in which the patching of a compiled executable code file occurs on a host computer system 100 that is separate from a target computer system 150 on which the patched executable code is to be executed. Compiled executable code files to be patched contain compiled instructions which are executable as native code on the CPU of target computer system 150, and which may or may not be executable as native code on the CPU of host computer system 100. In addition, in the illustrated embodiment the target computer system 150 has a RISC processor in which all instructions are the same length, so one compiled instruction will require the same memory space as another compiled instruction. Moreover, code statements are converted into a machine-independent non-compiled format that will be executed interpretively on the target computer system 150. Those skilled in the art will appreciate that code statements could alternatively be compiled and that the Code Patcher system 133 is not limited to patching code for RISC processors.

The host computer system 100 includes a CPU 110, input/output devices 120, a memory 130, and a bus 105. The input/output devices include a storage device 126, a network connection 122, a display 124, and a keyboard 125. The Code Patcher system 133 is executing in memory 130, and can be used to patch compiled executable code files such as compiled executable code file 132 stored on the storage device 126. The Code Patcher system 133 can also be stored on a storage device (not shown) such as storage device 126 before being loaded into memory 130, and the compiled executable code file 132 may also be loaded into memory 130 to assist operation of the Code Patcher system (e.g., for display to a user).

The target computer system 150 similarly includes a CPU 160, input/output devices 170, the memory 180, and a bus 155. The input/output devices 170 include a storage device 171 and a network connection 172. A Patch Interpreter Subsystem 181 is executing in memory 180 to assist in the execution of one or more patched executable code files on target computer system 150. The executable code file 132 is loaded into memory 180 when it is to be executed. After the executable code file is patched and becomes patched executable code file 182, the patch handlers 184 and code fragment executables 186 that are associated with the patched executable code file are also loaded into memory 180. The memory 180 also includes some or all of a Link Translation Table 188 in which current memory locations associated with various identifiers are stored, and of a Trace Log 189 in which information will be stored by the Patch Interpreter Subsystem 181 for later retrieval. In an alternate embodiment, Link Translation Table 188 and Trace Log 189 could be stored on storage device 171 and be accessed by Patch Interpreter Subsystem 181 only when needed. The Patch Interpreter Subsystem 181, patched executable code file 182, patch handlers 184, and code fragment executables 186 can also be stored on a storage device (not shown) such as storage device 171 before being loaded into memory 180.

When the Code Patcher system 133 is first invoked, the Command Subsystem 134 provides a user interface to a user (not shown) of the host computer system 100. The Command Subsystem 134 allows the user to specify a compiled executable code file that is to be patched, such as code file 132. The Command Subsystem 134 then loads information from executable code file 132 (e.g., from the symbol table) to allow a correspondence to be established between the compiled executable code instructions in the file and the original source code lines (not shown) from which the compiled executable code was created. The Command Subsystem 134 then displays the source code to the user and allows the user to specify a variety of commands.

After specifying compiled executable file 132, a user can use the Command Subsystem 134 to modify the file by specifying patches. Each set of code statements which are to be added is referred to as a patch, with each added code statement in a patch referred to as a patch statement. Executable code which has been patched (i.e., modified by having a patch added) is similarly referred to as patched code. As is explained in greater detail below, adding a patch to a compiled executable code file involves first creating an executable patch handler which causes the patch statements to be executed (and which may additionally perform various housekeeping functions) and then replacing one or more existing compiled instructions in the file with a patching instruction to transfer flow of execution to the patch handler.

In the illustrated embodiment, patch statements are stored in an executable machine-independent non-compiled format, and are interpreted (i.e., interpretively evaluated) by an evaluator when executed on target computer system 150. Patch Interpreter Subsystem 181 acts as an evaluator in the illustrated embodiment. Evaluators can be efficiently provided to a variety of target computer systems by crosscompiling an existing evaluator for each of the target systems. In an alternate embodiment, patch statements are stored as the original lines of source code and a source code interpreter (not shown) on target computer system 150 is used to interpret the patch statements. In yet another embodiment, patch statements are compiled for target computer system 150 before execution and are then executed natively on the target computer system.

A specified patch can take a variety of forms, such as substituting one or more new code statements for one or more existing compiled instructions or lines of source code. After they are substituted for, existing compiled instructions will no longer be executed. Rather than substituting new code statements, a specified patch can also be added such that it is executed in addition to the existing compiled instructions, including even the instructions replaced by patching instructions. This is accomplished by adding the replaced instructions to the patch handler for the patch. Multiple lines or instructions can be included in a patch, even when substituting for a single instruction or when no instructions are being substituted for. Some patches include code statements which form a complete module, such as an invokable routine. If such a module is being added so that it can be invoked by other code statements, rather than to be directly executed at a designated location, it is not necessary to use patching instructions to execute the module. Instead, other patch statements can reference the module and thus transfer flow of execution to the module.

Other patches include one or more code statements which do not form a complete module, referred to as a code fragment. Such patches will typically require that a patching instruction be added so that flow of execution reaches the code fragment. However, if a patch handler including a code fragment is referenced by another patch handler, the code fragment may not directly require a patching instruction for it to be executed. In addition, patch statements can include variables and expressions that will be evaluated in the context of the appropriate current variable scope, regardless of whether the scope is defined within the patch or by existing compiled instructions. Access to various information for the compiled executable code file to be patched, such as the symbol table, may be needed to resolve references to variables.

In addition to adding code statements, specialized trace requests can also be added to a compiled executable code file as patch statements. For some target computer systems, such as embedded systems without a display, it can be difficult to gather information about execution of executable code since traditional output mechanisms (e.g., print statements) are unavailable or are difficult to use. The trace requests will store specified information about the current execution of the executable code file in a manner that is accessible to a software developer. For example, if the executable code file is being executed on an embedded computer system, the trace mechanism can store execution information in a trace log file on the embedded computer system for later retrieval, or can transmit the information to a separate computer system for access there. The specified information for a trace request can also include variables and expressions that will be evaluated in the context of the current variable scope at the time of their execution. In addition to reporting the current values of variables and expressions, the trace requests can be used to track each time that a particular instruction or block of code is executed. For example, the first instruction in an invokable procedure can be patched with a trace request indicating the current values of the procedure parameters.

When a patch is to be added to compiled executable code file 132, the user indicates the patch statements for the patch as well as where the patch is to be added (e.g., in a particular function or at a specific source code or compiled instruction location). In the illustrated embodiment, a patching instruction need replace only a single existing instruction since all RISC instructions are the same size. The user also specifies whether the patch is to substitute for existing compiled instructions or is to be added in addition to the existing instructions. In addition, when a patch is being added in addition to existing instructions, it is determined or specified whether the patch is to be added before or after the existing instructions. When a function is indicated as the patch location, the patch is added at the first instruction for the function (i.e., the patching instruction replaces the first instruction for the function). When a source code line is indicated, the Command Subsystem 134 identifies the one or more corresponding compiled instructions. If multiple instructions correspond to a source code line, one or more of the compiled instructions are selected to be replaced by the patching instruction. The determination of whether the patch is to be added before or after the existing instructions may affect which of the multiple corresponding instructions are selected (e.g., if the patch is added before the instructions, selecting the first of the multiple corresponding instructions).

The Command Subsystem 134 also allows the user to perform actions on existing patches, such as to group patches together and to manipulate them either individually or as a group. For example, a patch previously added to the compiled executable code file can be disabled so as to prevent its execution. Patches can also be qualified with conditions such that the patch will be executed only when the conditions are true at the time of execution. In addition, different patches can be grouped together and each group can be manipulated in the same manner as a single patch. For example, all patches in a group can be enabled or disabled, or can be saved for later use. This ability to group, disable/enable, and qualify patches without recompiling the file allows trace requests to be turned on or off in a simple and efficient manner, greatly simplifying debugging. Finally, a user can also use the Command Subsystem 134 to retrieve and view previously created trace information, such as from a trace log.

After all the patches have been specified and the user is ready to execute the code file 132 as patched, the Command Subsystem 134 notifies a Patching Subsystem 136 of the patches and notifies a Code Fragment Executables Subsystem 138 of the code statements from the patches. The Code Fragment Executables Subsystem 138 converts each sequence of one or more code statements it receives into a code fragment executable 186 in an executable machine-independent non-compiled format. Code fragment executables can be executed in an interpreted manner on any target system with an evaluator for the format. In one embodiment, the code fragment executables are stored as parse trees, as is illustrated further with respect to FIGS. 3A and 3B. Each code fragment executable will be associated with the corresponding code file being patched, and will also have a unique identifier by which it can be referenced. For example, other statements can use the unique identifier for a code fragment executable representing a module to invoke the module.

After creating the code fragment executables 186 for the code statements in the patches, the Code Fragment Executables Subsystem 138 then transfers the created code fragment executables to target computer system 150 and updates Link Translation Table 188. Link Translation Table 188 includes a reference for each symbol in each of the code fragment executables 186 which can be referenced by statements outside the code fragment executable (e.g., the unique identifier for a code fragment executable and any exported symbols that can be referenced outside the code fragment executable). Those skilled in the art will appreciate that in an alternate embodiment, Link Translation Table 188 could be stored in an alternate location such as on the host computer system 100. In addition, those skilled in the art will appreciate that the code fragment executables 186 could initially be stored on storage device 126 before being transferred, and could be transferred directly to memory 180 or first to storage device 171.

When the Patching Subsystem 136 receives notification of the patches from the Command Subsystem 134, the Patching Subsystem 136 creates the appropriate patch handlers 184 and places patching instructions in the appropriate locations in the compiled executable file 182. In addition, in some embodiments, the Patching Subsystem 136 can allocate and deallocate computer system resources on the target computer system 150 needed for the patch handlers 184 (e.g., memory in which to load the patch handlers). The Patching Subsystem 136 first transfers the compiled executable code file 132 to the target computer system 150. After creating the patch handlers 184, the Patching Subsystem 136 transfers the patch handlers 184 to the target computer system 150, and updates Link Translation Table 188 as necessary to include references for the patch handlers 184. The Patching Subsystem 136 also modifies the compiled executable code file on the target computer to include the patching instructions, thus creating patched compiled executable code file 182. Those skilled in the art will appreciate that the patch handlers 184 could initially be stored on storage device 126 before being transferred, and could be transferred directly to memory 180 or first to storage device 171.

In particular, at each location in the executable code file 132 where a patch is to be added, the Patching Subsystem 136 replaces an existing compiled instruction with a patching instruction, thus removing the replaced instruction from patched compiled executable file 182. Those skilled in the art will appreciate that in an alternate embodiment, an already-patched code file such as file 182 could have additional patches added. In that embodiment, an old patching instruction could be selected as the instruction to be replaced with a new patching instruction. If the new patch is intended to supplement rather than substitute for the previous patch, the replaced old patching instruction can be added to the new patch handler so that the old patch handler will be also executed. Each patching instruction alters the flow of execution to an appropriate patch handler so that the patch statements for the patch will be executed.

In one embodiment, each patch has a distinct patch handler, while in an alternate embodiment a single patch handler can handle all patches. Thus, when the flow of execution reaches a patching instruction, execution will be transferred to and will continue at the appropriate patch handler. In some embodiments, the patching instructions are transfer statements (e.g., jump, goto, branch, call, etc.) which specify an explicit memory location (either directly or via an offset) in which the patch handler will be executed. In alternate embodiments, the patching instructions include a unique reference to the appropriate patch handler, and the appropriate memory location for the referenced patch handler is determined from Link Translation Table 188 at the time of execution. In yet other embodiments, the patching instructions are trap instructions, and the appropriate memory location for the referenced patch handler is determined from a return Program Counter map. Thus, in these embodiments the patching of compiled executable file 132 is performed without recompiling, relinking or rewriting the file.

In addition to inserting patching instructions, Patching Subsystem 136 must also create appropriate patch handlers 184 so that the patch statements are exhibited when flow of execution is transferred to the patch handler. Each patch handler 184 will first save the current state of execution (e.g., register and stack values) if necessary, and then include the code fragment executables and/or trace requests to be executed for the patch. If the patch is to be added to compiled executable code 132 rather than substituting for the compiled instruction replaced by the patching instruction, the replaced instruction must also be added to the patch handler so that it will be executed. For example, if the patch is to be added after the replaced instruction, then the replaced instruction would be added at the beginning of the patch handler before any of the patch statements. Alternately, if the patch is to be added before the replaced instruction, the replaced instruction would instead be added after the patch statements. Finally, the patch handler will, if necessary, restore the saved state of the computer and will then return the flow of execution to the instruction in the compiled executable code after the patching instruction.

Similarly to the created code fragment executables 186, each patch handler 184 will be uniquely identified in some way so that it can be referenced by its associated patching instruction. In one embodiment, a patch handler will always be loaded at a specific location in memory 180 on target computer system 150, and thus the patching instruction can explicitly indicate that memory location when the patching instruction is added to the patched compiled executable file 182 by the Patching Subsystem 136. This memory 180 location can be identified at the time the patch handler 184 is created if the Patching Subsystem 136 performs memory management for the target computer system 150 in which it can allocate and deallocate blocks of memory. Alternately, the Patching Subsystem 136 could request that the target computer system 150 allocate a block of memory 180 and provide the memory location information to the Patching Subsystem 136. In an alternate embodiment, patch handlers 184 are loaded into different locations of memory 180 with each execution of the patched executable code file 182. In that embodiment, Link Translation Table 188 can be used to map a unique identifier for each patch handler 184 to its current location in memory 180. In a similar manner, code fragment executables 186 can be stored with patch handlers 184 and loaded into the memory block for the patch handlers, or can instead be loaded into separate locations in memory 180. If loaded separately in memory 180, a patch handler can merely reference a unique identifier for a code fragment executable, and Link Translation Table 188 can be used to identify the current memory location at which to access the code fragment executable. In another embodiment, patch handlers 184 and code fragment executables 186 are loaded into different locations of memory 180 with each execution of the patched executable code file 182, but rather than using Link Translation Table 188 the patched compiled executable file 182 is modified before each execution so that identifiers are replaced with the current memory location for the associated item.

When the patched executable code file 182 is to be executed, the Patch Interpreter Subsystem 181 on the target computer system 150 controls the execution. In particular, the Patch Interpreter Subsystem 181 ensures that compiled instructions are executed as compiled native code on target computer system 150, while patch statements (if stored in machine-independent form) are interpreted. The Patch Interpreter Subsystem 181 also uses Link Translation Table 188 to resolve references to symbols, modules, code fragment executables, and patch handlers as necessary. Thus, if a patching instruction merely references the unique identifier for a patch handler 184, the Patch Interpreter Subsystem 181 will identify the memory location of the patch handler and transfer flow of execution there rather than trying to execute the patching instruction as native code. As trace requests are encountered during execution, the specified information for the trace request is stored in an appropriate manner, such as in Trace Log 189. The Patch Interpreter Subsystem 181 performs its interpreted evaluation in a manner so as to ensure that variables and expressions are evaluated in the context of the appropriate current variable scope. In one mode, the Patch Interpreter Subsystem 181 works independently without external influence. In an alternate mode, a user on the host computer system 100 can use the Command Subsystem 134 to interact with Patch Interpreter Subsystem 181 and to control execution of the patched executable file 182.

In one embodiment, the target computer system 150 is an embedded computer system, the Code Patcher system 133 is part of a debugger on the distinct host computer system 100, and the compiled executable file 132 is a terminal emulator to be executed on the embedded system. In this embodiment, the Code Patcher system 133 allows a user to perform normal debugging functions (e.g., single stepping through a compiled program) but also allows the user to interactively modify an existing compiled executable code file in a permanent manner without requiring a compile/link/transfer/debug cycle.

The user can also manipulate the patches in a variety of ways in this embodiment. For example, a patch can be added to the compiled executable code file but can be disabled. In this situation, the functionality added by the patch is not executed while the patch is disabled, either by replacing the patch with the original patched instruction or by indicating to the Patch Interpreter Subsystem 181 to not execute the patch statements. In addition, different patches can be grouped together and each group can be manipulated in the same manner as a single patch. For example, all patches in a group can be enabled or disabled, or can be saved for later use. Patches can also be qualified with conditions such that the patch will be executed only when the conditions are true at the time of execution.

In addition to significantly reducing the time needed to create source code, the Code Patcher system 133 can be used for a variety of other purposes. For example, an executable code file may have been incomplete when compiled. In this situation, references to symbols (e.g., variables or functions) may have been stubbed at the time of compilation. The Code Patcher system 133 can be used to replace the stubs with references to code fragment executables. In addition, additional functionality can be added even to compiled executable code files that lack errors. For example, a graphical user interface could be added to an executable code file with only a command-line interpreter, or new functionality can be added to handle inputs or situations not anticipated at the original time of compilation. Those skilled in the art will appreciate that any such type of functionality can be added using the Code Patcher system 133. Those skilled in the art will also appreciate that computer systems 100 and 150 are merely illustrative and are not intended to limit the scope of the present invention. The computer systems may contain additional components or may lack some illustrated components. Accordingly, the present invention may be practiced with other computer system configurations, including a single computer system.

As an illustrative example of patching compiled executable code, consider FIGS. 2A and 2B. FIG. 2A illustrates sequences of compiled instructions from a compiled executable code file. For readability, a corresponding source code line is shown for each instruction. Those skilled in the art will appreciate that the particular source code lines are merely illustrative. FIG. 2B illustrates the same compiled executable code file after various patches have been added. In particular, five patches, including a code fragment executable module, have been added to the original compiled executable code file.

Patch 1 demonstrates a patch that adds a trace request before instruction N. As is shown in FIG. 2B, instruction N is replaced in the compiled executable code file with a patching instruction that indicates to transfer flow of execution to a patch handler for Patch 1. When execution is transferred to the patch handler for Patch 1, the patch handler first saves the current state of the target system on which execution is occurring. The patch handler then issues a trace request for a designated string of information. The original patched instruction, instruction N, is then executed in the patch handler. Thus, Patch 1 executes the trace request in addition to, rather than substituted for, the replaced instruction N. After executing instruction N, the original state of the computer system is then restored before the flow of execution is returned to instruction N+1. Those skilled in the art will appreciate that an execution such as the trace request can be performed in a variety of ways, such as by writing the specified information to a file or by sending the information to another computer, such as in a message object or as text in an email message. Alternately, trace information can be output using any other communication means (e.g., pager, cellular phone, display device, etc.). Note that although the trace request in Patch 1 did not include any variables or expressions to be evaluated, instruction N will require the evaluation of the variables a and c. This evaluation will occur in the context of the appropriate current variable scope.

Patch 2 reflects a patch which replaces instruction N+3 with multiple patch statements, including both a trace request and a code fragment executable. Patch 2 also demonstrates a patch that substitutes for an existing instruction rather than adding patch statements, and thus existing instruction N+3 will be not executed in the patched executable code file. When flow of execution is transferred to the patch handler for Patch 2, the patch handler first saves the current target computer system state. The patch handler then executes the trace request and the code fragment executable as shown. Note that this trace request will require the evaluation of variable a, which will be performed in the context of the appropriate current variable scope. The code fragment executable will be executed in an interpreted manner. After executing the various instructions in the patch handler, the original computer system state is restored before returning flow of execution to instruction N+4.

As is shown in FIG. 2B, the code fragment executable module labeled FN2 has also been added as part of the patch process. Patch 3 adds patch statements before instruction N+6, including a call to the newly created module. Patch 3 also illustrates that multiple code statements can be executed within a patch handler (limited only by available memory on the target computer system). After flow of execution transfers to the patch handler for Patch 3, the appropriate computer system state is first saved. Next, the code fragment executable for the code statement 'b=b−1' is executed in an interpreted manner. The next patch statement calls module FN2 with the variable b as a parameter. Flow of execution will then transfer to the code fragment executable for module FN2, at which time instructions M, M+1, and M+2 will be executed in sequence in an interpreted manner. Upon execution of the return statement in instruction M+2, the flow of execution will return to instruction N+6 in the patch handler for Patch 3. After restoring state for Patch 3, the flow of execution will return to instruction N+7 in the patched compiled executable code file. Those skilled in the art will appreciate that each of the patch handlers can return flow of execution to the compiled instructions in a variety of ways, such as using a return statement or explicitly using the memory location of the next compiled instruction. In addition, in one embodiment each code statement has a separate code fragment executable, while in another embodiment the various code statements in a patch handler are combined into a single code fragment executable.

Finally, Patch 4 illustrates that compiled functions can be patched and traced in a manner similar to that of any other compiled instruction. For example, if a user desires to trace all invocations of the function FN1, Patch 4 can be added before the first instruction of the function, instruction P. The trace requests in Patch 4 illustrate that when the variable X is evaluated, it will be evaluated using the current variable scope of function FN1, but that the global variable Y will be evaluated using the appropriate variable scope for Y, which may be the entire program rather than the local scope of function FN1. Those skilled in the art will appreciate that a variety of other patches are possible.

Figure 3A:
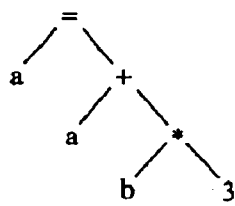
FIGS. 3A and 3B illustrate examples of source code in an executable computer-independent non-compiled parse tree format.
Figure 3B:
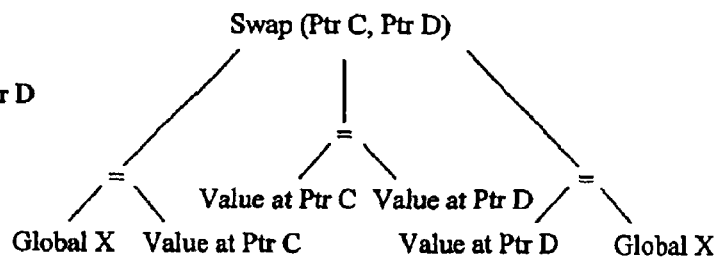

Referring now to FIGS. 3A and 3B, illustrative examples of code fragment executables stored in an executable machine-independent non-compiled format are shown. In particular, the exemplary machine-independent format shown are parse trees. In FIG. 3A, the source code statement 'A=A+(B*3)' is shown, along with a corresponding parse tree that encodes this source code statement. The original source code line can be reconstructed by using depth-first search along the parse tree, using non-leaf nodes only after the first child branch has been used. Similarly, FIG. 3B illustrates a possible parse tree for the source code function Swap as shown. As the parse tree is read from left to right and upwards from the leaf nodes, the appropriate order of statements for the Swap function is retrieved. Those skilled in the art will appreciate that a parse tree can be represented using different formats, and that parse trees are only one possible format for encoding executable machine-independent code fragment executables.

Figure 4:
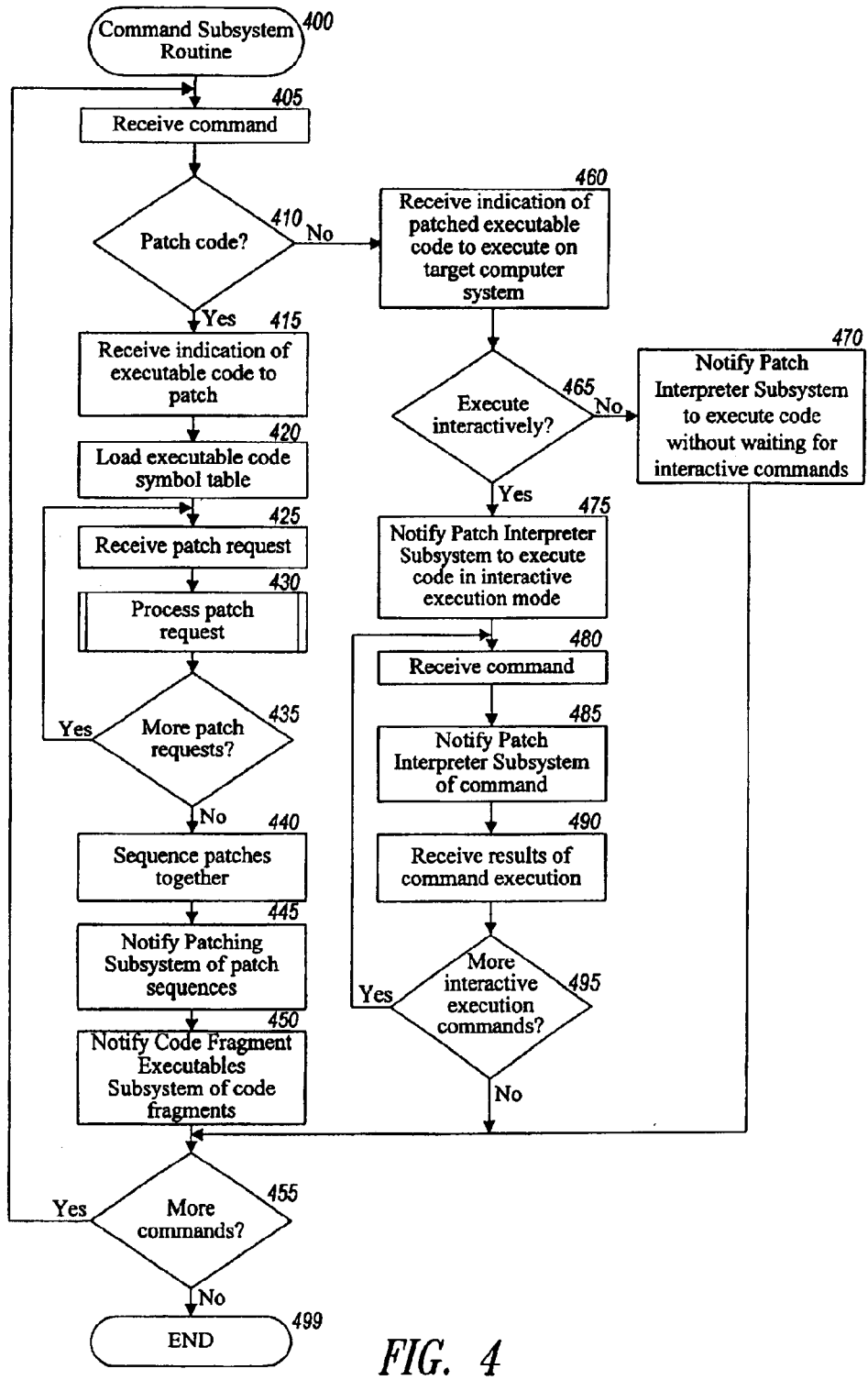
FIG. 4 is an exemplary flow diagram of an embodiment of the Command Subsystem routine.

FIG. 4 is an exemplary flow diagram of an embodiment of the Command Subsystem routine 400. The Command Subsystem routine will receive a command from a user to either patch a compiled executable code file such as code file 132 or to execute an already patched executable code file such as patched code file 182. In an alternate embodiment, patches can be added to a compiled executable code file that already contains patches (and can even patch already patched instructions), as well as to a compiled executable code file without patches. If the user is currently patching a compiled executable code file, the routine will accept a variety of trace requests and code fragments to be added to the code file, will combine multiple patches if they are to be added at the same compiled instruction in the compiled executable code file, and will notify the Patching Subsystem 136 (FIG. 1) and the Code Fragment Executables Subsystem 138 (FIG. 1) of the patches. If the user is executing an already patched executable code file, the routine can receive commands, relay them to the Patch Interpreter Subsystem 181(FIG. 1), and receive and display to the user the results of the execution of the command. In one embodiment in which the Command Subsystem 134 (FIG. 1) provides interactive control over a patched executable code file, a user can determine whether or not to view the source code for patches (e.g., not viewing source code for disabled patches).

The Command Subsystem routine begins at step 405 where a command is received from a user. The routine continues in step 410 to determine if the command is to patch a compiled executable code file. If so, the routine continues to step 415 where it receives an indication of the executable code file to be patched. The routine then continues in step 420 to load information from the symbol table of the indicated executable code file, thus allowing the source code lines corresponding to the compiled executable code instructions to be displayed to the user. The routine then continues to step 425 where a request is received from the user that is related to patching the compiled executable code file. The routine continues in step 430 to execute the Process Patch Request subroutine to process the request. As is explained in greater detail with relation to FIG. 5, possible patch requests include adding various trace requests or code fragments, grouping and degrouping patches, and manipulating previously created patches. After the patch request has been processed in step 430, the routine continues in step 435 to determine if there are more patch requests from the user. If so, the routine returns to step 425 to receive the next patch request.

If there are not more patch requests from the user, the routine continues to step 440 to sequence patches together when they will replace the same compiled instruction. Since any given compiled instruction in the compiled executable code file can only be replaced with a single patching instruction to a patch handler, multiple patches that have been associated with a single compiled instruction must be sequenced together. Additional steps may also need to be taken to ensure that all patches are executed and that the correct order of patch execution is followed. In the illustrated embodiment, multiple patches associated with a single compiled instruction are placed in a single patch handler for the patching instruction that will replace the compiled instruction. Alternately, multiple patch handlers could be used, with each patch handler transferring flow of execution to the next patch handler in sequence and with the last patch handler returning the flow of execution to the compiled instruction following the patching instruction. In either case, a sequence in which to execute the multiple patches must be selected. For example, all trace requests could be executed either before or after all code fragments. In the illustrated embodiment, the user indicates the sequence of patches when the patches are created.

After step 440, the routine continues to step 445 to notify the Patching Subsystem 136 of the patch sequences to be added to the compiled executable code file, including sequences of a single patch. The routine then continues to step 450 to notify the Code Fragment Executables Subsystem 138 of the code fragments, including created modules, that have been added as patches to the compiled executable code file. The routine continues in step 455 to determine if there are more commands from the user. If so, the routine returns to step 405 to receive a user command, and if not, the routine ends at step 499.

If it is instead determined in step 410 that the received user command is not to patch a compiled executable code file, the routine continues to step 460 where an indication of a patched compiled executable code file is received. This patched code file will be executed on an indicated target computer system. In the illustrated embodiment, the patched code and any associated patch handlers and code fragment executables will have been transferred to the indicated target system when the patching occurred. Alternately, the transferring could occur after step 460. The routine next continues to step 465 to determine if the patched code file is to be executed with interactive control by the user. If the patched executable code file is not to be executed interactively, the routine continues to step 470 where the Patch Interpreter Subsystem 181 is notified to execute the patched executable code file without waiting for interactive commands. If instead it is determined in step 465 that the patched executable code file is to be executed interactively, the routine continues instead to step 475 where the Patch Interpreter Subsystem 181 is notified to execute the patched executable code file in an interactive execution mode.

The routine next continues to step 480 to receive an execution-related command from the user. Such commands could include setting or removing break points, checking the current values of variables and expressions, or stepping through the execution a single line at a time. In the illustrated embodiments, the manipulation of patches does not occur during interactive execution, but such functionality could be provided in an alternate embodiment. In step 485, the routine notifies the Patch Interpreter Subsystem 181 of the command, and in step 490 the results of the command execution are received from the Patch Interpreter Subsystem 181 and are displayed to the user. The routine then continues to step 495 to determine if there are more interactive execution commands from the user. If so, the routine returns to step 480 to receive the next user command. After step 470, or if it is determined in step 495 that there are not more interactive execution commands, the routine continues to step 455 to determine if there are more user commands. Those skilled in the art will appreciate that the Command Subsystem routine can be implemented in a variety of ways. For example, other top-level user commands than patching compiled executable code files and executing patched compiled executable code files could be processed by the routine. Alternately, separate routines could be used to patch a compiled executable code file and to execute a patched compiled executable code file.

Figure 5:
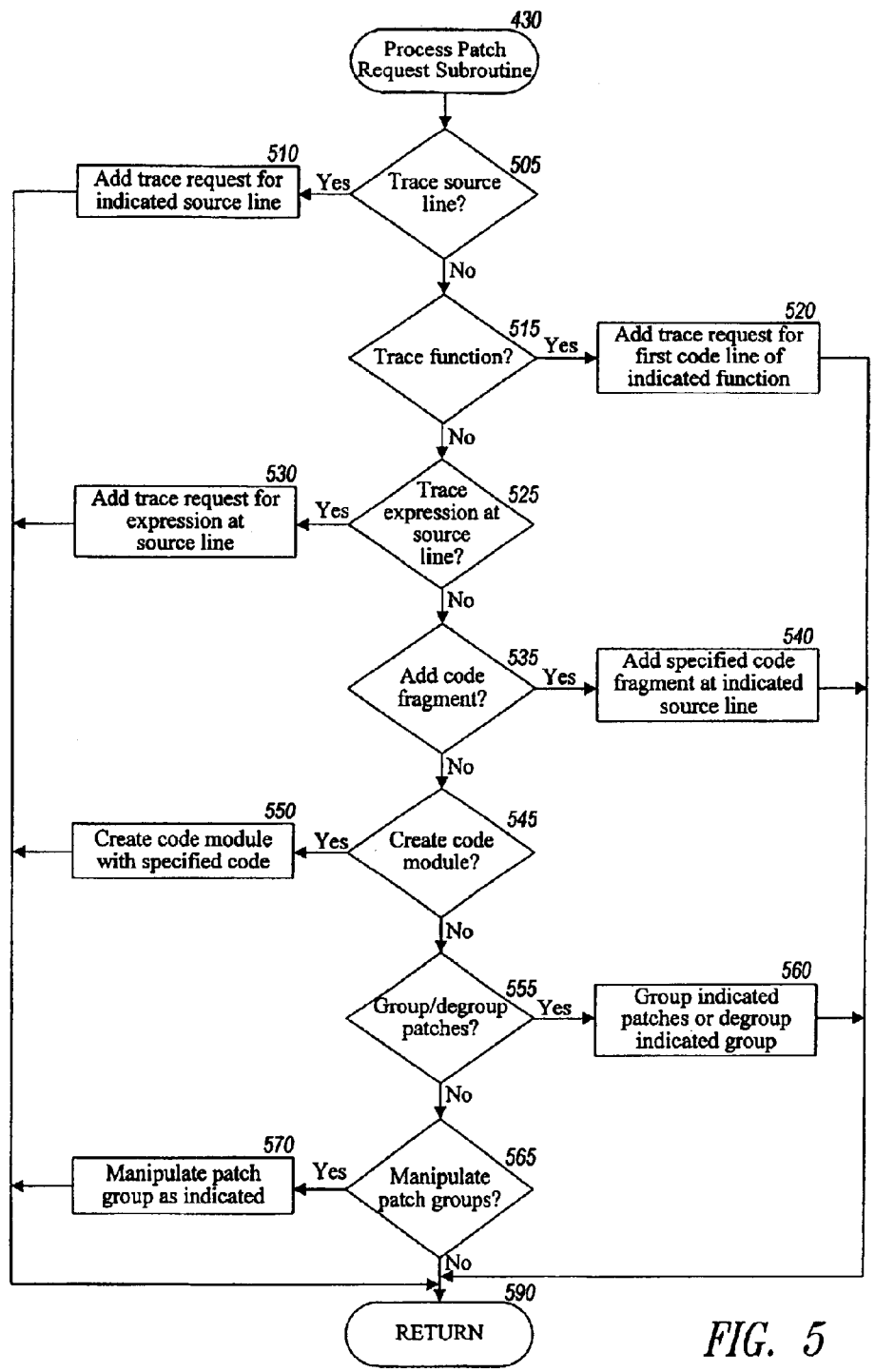
FIG. 5 is an exemplary flow diagram of an embodiment of the Process Patch Request subroutine.

FIG. 5 is an exemplary flow diagram of an embodiment of the Process Patch Request subroutine 430. The Process Patch Request subroutine receives a user request related to patching the compiled executable code file, determines the type of patch request, and satisfies the patch request. In the illustrated embodiment, the user indicates source code lines corresponding to compiled instructions in the compiled executable code file for patch requests, and the Code Patcher system 133 selects the appropriate compiled instruction for the indicated source code line when performing the request.

The subroutine begins at step 505 where it is determined if the patch request is to add a trace request to indicate when a source code line is executed. If so, the subroutine continues to step 510 to add the trace request to an appropriate patch handler, which will be referenced by a patching instruction that replaces a compiled instruction corresponding to the indicated source code line. If it is instead determined that the trace request is not to trace a source code line, the subroutine continues to step 515 to determine if the patch request is to add a trace request to indicate when a function in the compiled executable code file is executed. If so, the subroutine continues to step 520 to add a trace request to a patch handler for the first instruction of the indicated function. If the patch request is not to trace a function, the subroutine continues to step 525 to determine if the patch request is to add a trace request for a specified expression at a particular source line. If so, the subroutine continues to step 530 to add a trace request for the expression to a patch handler at the indicated source line. If the patch request is not to trace a specified expression, the subroutine instead continues to step 535 to determine if the patch request is to add a specified code fragment to the compiled executable code file. If so, the subroutine continues to step 540 to add the specified code fragment executable to a patch handler at the compiled instruction corresponding to an indicated source line. The user can also indicate whether the patch is to substitute for the instruction or to be added in addition to the instruction, and when the patch is added in addition to the instruction whether the patch is to be executed before or after the source code line.

If it has been determined in steps 505, 515, 525, and 535 that the patch request is not to add to the compiled executable code file patch statements that require patch handlers, the subroutine continues to step 545 to determine if the patch request is to create a code fragment module. If so, the subroutine continues to step 550 where an invokable code module with multiple source code statements is specified by the user, and an associated code fragment executable module is created for the patched executable code file. If it is determined in step 545 that the patch request is not to create a code module, then the subroutine continues to step 555 to determine if the patch request is to group patches together or to degroup previously grouped patches into individual patches. If so, the subroutine continues to step 560 to perform the indicated grouping or degrouping. If the patch request is not to group or degroup patches, the subroutine continues to step 565 to determine if the patch request is to manipulate a patch or patch group if so, the subroutine continues in step 570 to manipulate the patch or the patches in a patch group as indicated. After step 510, 520, 530, 540, 550, 560, or 570, or if it is determined in step 565 that the patch request does not manipulate a patch or a patch group, the subroutine continues to step 590 where it returns.

Figure 6:
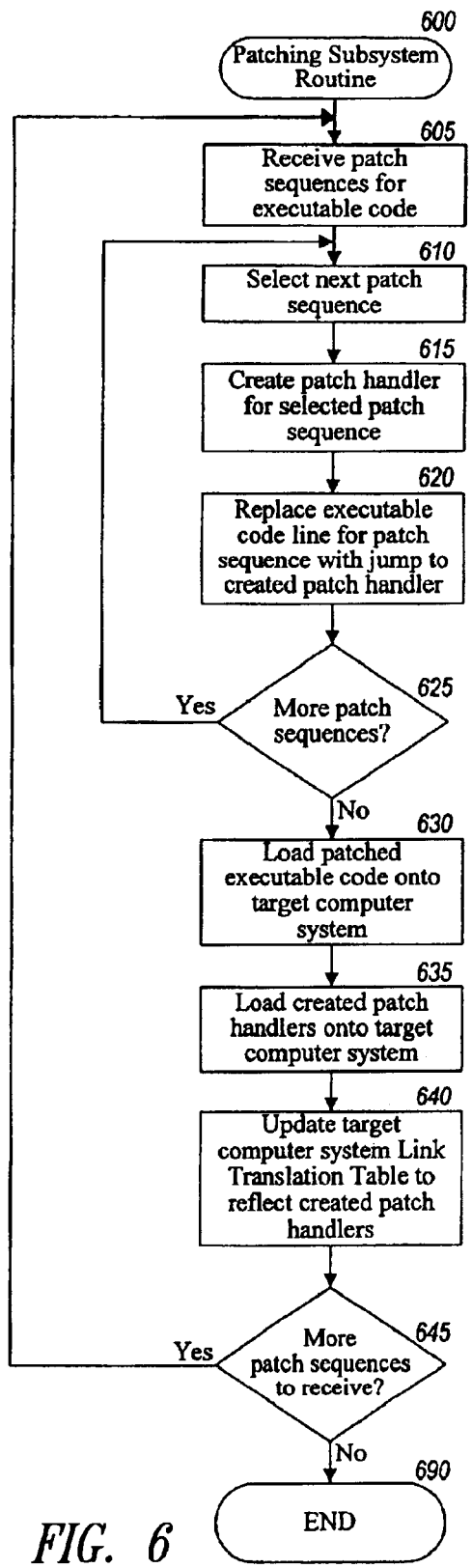
FIG. 6 is an exemplary flow diagram of an embodiment of the Patching Subsystem routine.

FIG. 6 is an exemplary flow diagram of an embodiment of the Patching Subsystem routine 600. The Patching Subsystem routine is notified by the Command Subsystem routine when patch sequences are to be added or manipulated for a compiled executable code file. The Patching Subsystem routine then creates the necessary patch handlers, patches the compiled executable code file in the appropriate manner, and loads the patch handlers and the patched compiled executable code file onto a target system. The routine begins at step 605 where one or more patch sequences are received for a compiled executable code file. This notification from the Command Subsystem 134 can also indicate that previously added patches have been manipulated (e.g., removed or disabled). The routine continues in step 610 to select the next received patch sequence to be added or manipulated, beginning with the first received patch sequence. The routine then continues to step 615, where an appropriate patch handler is created if the selected patch sequence indicates that a patching instruction is to be added to the compiled executable code file. Alternately, if an existing patch is being changed, an existing patch handler can be accordingly modified or a new patch handler can be created to replace an existing patch handler. For example, if a previously added patch is being removed, the original patched instruction can be reinserted in the compiled executable code file in place of the patching instruction. Alternately, if a patch handler is being disabled, the first instruction of the patch handler could be modified to cause a jump to the end of the patch handler or to the instruction following the patching instruction. Similarly, if a patch is being qualified, the patch handler for that patch can be modified to include evaluation statements to determine if the specified conditions are true.

After step 615, the routine continues to 620 to, if a patching instruction needs to be added, replace the appropriate compiled executable code instruction with a patching instruction (e.g., a jump statement) to the created patched handler. If an existing patch handler is merely being modified, it will not be necessary to replace a compiled instruction with a patching instruction since the existing patching instruction will still be effective. While the illustrated embodiment uses a jump instruction for patching instructions, those skilled in the art will appreciate that a patch handler can be invoked in a variety of ways, such as by using an interrupt mechanism or by including an identifier that will be resolved at execution time to indicate an appropriate location in memory on the target system. In addition, those skilled in the art will appreciate that a compiled transfer statement instruction could be used as a patching instruction. After step 620, the routine continues in step 625 to determine if there are more patch sequences to be selected. If so, the routine returns to step 610 to select the next patch sequence, and if not, the routine continues to step 630.

After patch handlers have been created or modified for each patch sequence and patching instructions have been added to the compiled executable code file, the routine in step 630 loads the patched executable code file onto the target system. The routine then continues in step 635 to load any created and/or modified patch handlers onto the target system. In the illustrated embodiment, the Patching Subsystem 136 does not perform memory management for target computer system 150, so the memory locations on the target system in which the created patch handlers will be loaded will not be known until execution time. Thus, the patching instructions inserted into the compiled executable code file merely reference the appropriate patch handler, with the reference to the appropriate memory location to be resolved at execution time. This type of reference resolution allows linking to be delayed until execution time. Thus, after step 635, the routine continues in step 640 to update a Link Translation Table on the target system to reflect the unique identifiers for the created patch handlers. After step 640, the routine continues to step 645 to determine if there are more patch sequences to receive. If so, the routine returns to step 605 to receive patch sequences, and if not the routine continues to step 690 and ends.

Figure 7:
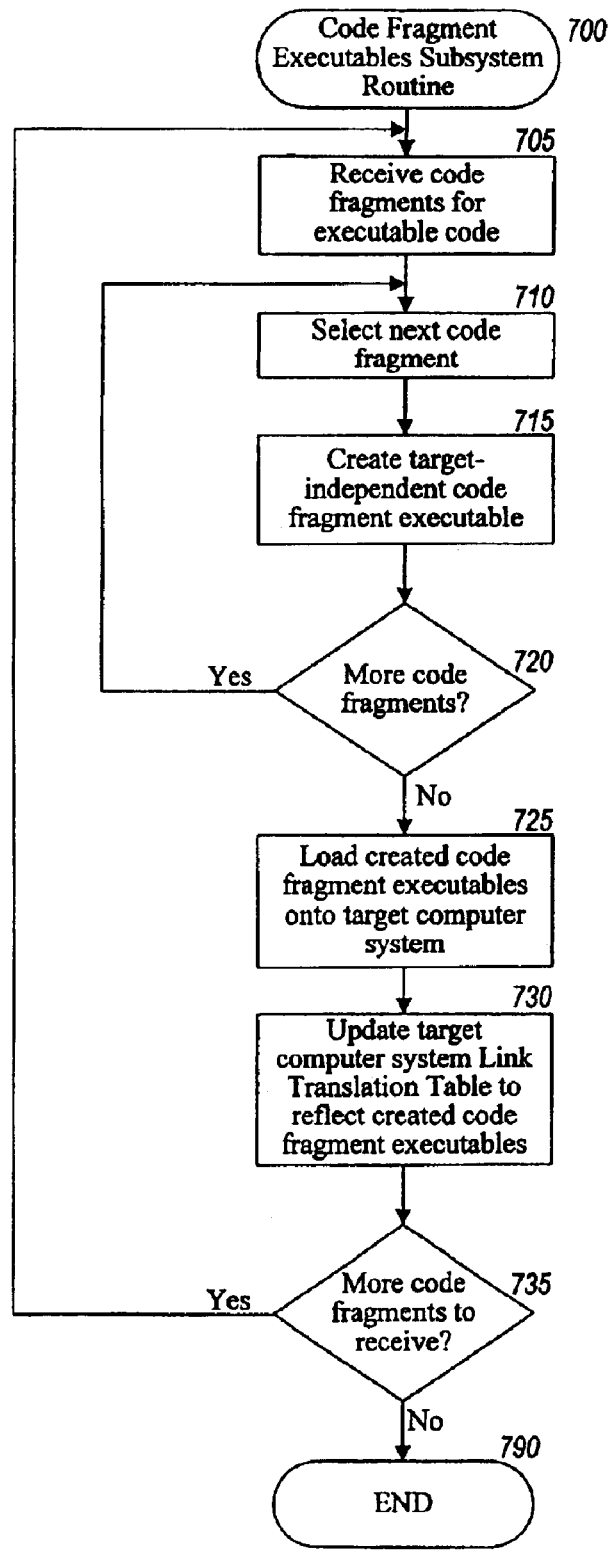
FIG. 7 is an exemplary flow diagram of an embodiment of the Code Fragment Executables System routine.

FIG. 7 is an exemplary flow diagram of an embodiment of the Code Fragment Executables Subsystem routine 700. The Code Fragment Executables Subsystem routine receives notifications from the Command Subsystem 134 when code fragments are to be added to the compiled executable code file, creates machine-independent non-compiled code fragment executables that can be interpreted by the Patch Interpreter Subsystem 181, and loads the created code fragment executables onto the target system. The routine begins in step 705 where code fragments to be added to the compiled executable code file are received from the Command Subsystem. The routine continues to step 710 to select the next code fragment, beginning with the first code fragment. In step 715, the routine then creates a code fragment executable for the selected code fragment in a machine-independent format not specific to the target computer. In the illustrated embodiment, the code fragment executables are stored in parse tree format. The routine then continues in step 720 to determine if there are more code fragments to process. If so, the routine returns to step 710 to select the next code fragment, and if not the routine continues to step 725.

After the code fragment executables have been created, the routine in step 725 loads the created code fragment executables onto the target system. The routine then continues to step 730 to update the Link Translation Table on the target system to reflect the references for the created code fragment executables. For example, if invokable code modules have been created for the patched compiled executable code file, an entry in the Link Translation Table can be used to resolve at execution time a reference to a code module, allowing flow of execution to be transferred to the appropriate memory location where the code fragment executable for the module is loaded in memory. Similarly, if variables have been defined and made available to other portions of the code outside a self-contained variable scope (e.g., global variables), the Link Translation Table can be used to resolve references to those variables by other portions of the code. Finally, if the code fragment executables are loaded into memory separate from the patch handlers that will reference those code fragment executables, then the Link Translation Table can be used to resolve the references for each such code fragment executable.

Those skilled in the art will appreciate that if the memory locations for code fragment executables are known at the time that the patches and patch handlers are created, it may not be necessary to use a Link Translation Table to resolve those references. For example, if code fragment executables are included with the patch handlers which reference them, then each such code fragment executable would not need a unique identifier that could be resolved through the use of the Link Translation Table. After step 730, the routine continues in step 735 to determine if there are more code fragments to receive. If so, the routine returns to step 705, and if not the routine ends at step 790.

Figure 8:
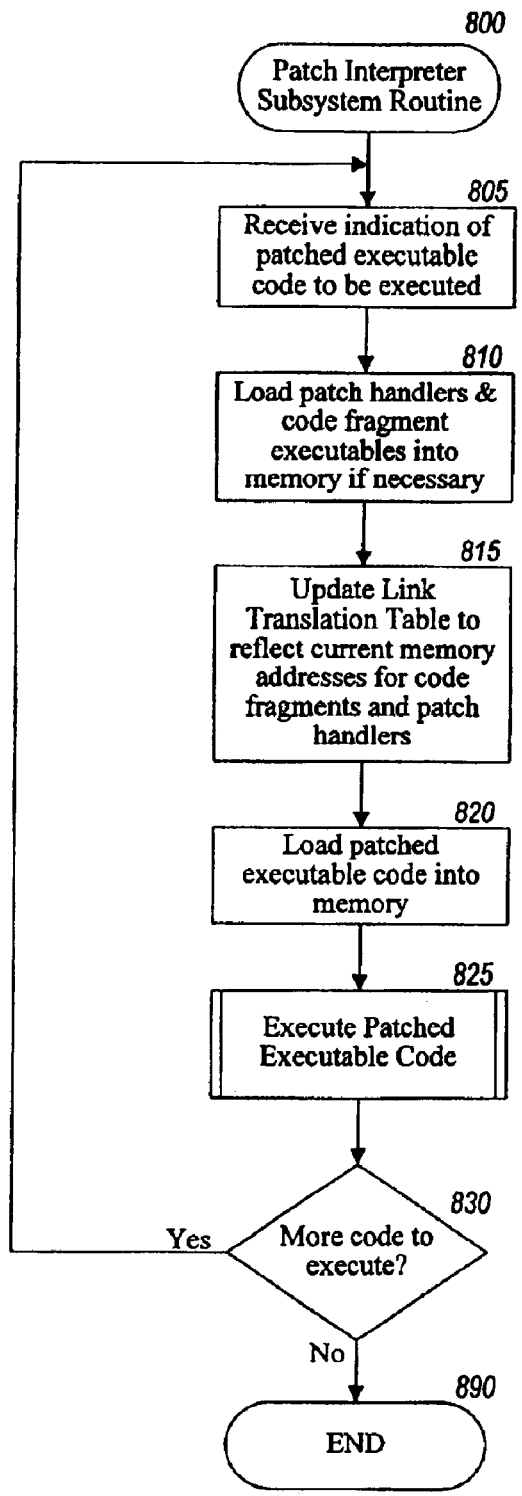
FIG. 8 is an exemplary flow diagram of an embodiment of the Patch Interpreter Subsystem routine.

FIG. 8 is an exemplary flow diagram of an embodiment of the Patch Interpreter Subsystem routine 800. The Patch Interpreter Subsystem routine receives an indication of a patched executable code file to be executed, loads the patched compiled executable code file as well as associated patch handlers and code fragment executables into memory, executes the non-patched compiled instructions as native code for the target system, and executes the patch statements in an interpreted manner. Those skilled in the art will appreciate that in an alternate embodiment, before execution time the Patch Interpreter Subsystem 181 or another subsystem could compile the target-independent code fragment executables into compiled instructions that are native to the particular target system. In this situation, the Patch Interpreter Subsystem 181 would only be needed to resolve references, such as for patch handlers and code fragment executable modules, when such references are included in the patched compiled executable code file.

The routine begins in step 805 where an indication is received of the patched executable code file to be executed. In the illustrated embodiment, this indication is received from the Command Subsystem 134 on the host computer system. In an alternate embodiment, the Patch Interpreter Subsystem 181 could receive instructions directly from a user on the target computer system if the target system included the necessary input/output devices. The routine then continues to step 810 to load the patch handlers and code fragment executables associated with the patched compiled executable code file into memory if they are not already stored in memory. The routine then continues to step 815 to ensure that the Link Translation Table reflects the current memory addresses for the code fragment executables and the patch handlers. After step 815, the routine continues to step 820 where the patched compiled executable code file is loaded into memory if it is not already stored in memory. The routine then continues to step 825 to execute the Execute Patched Executable Code subroutine. The routine then continues to step 830 to determine if there are more patched compiled executable code files to execute. If so, the routine returns to step 805, and if not, the routine ends at step 890. Those skilled in the art will appreciate that in an alternate embodiment, the Patch Interpreter Subsystem routine could execute multiple different patched executable code files at the same time.

Figure 9:
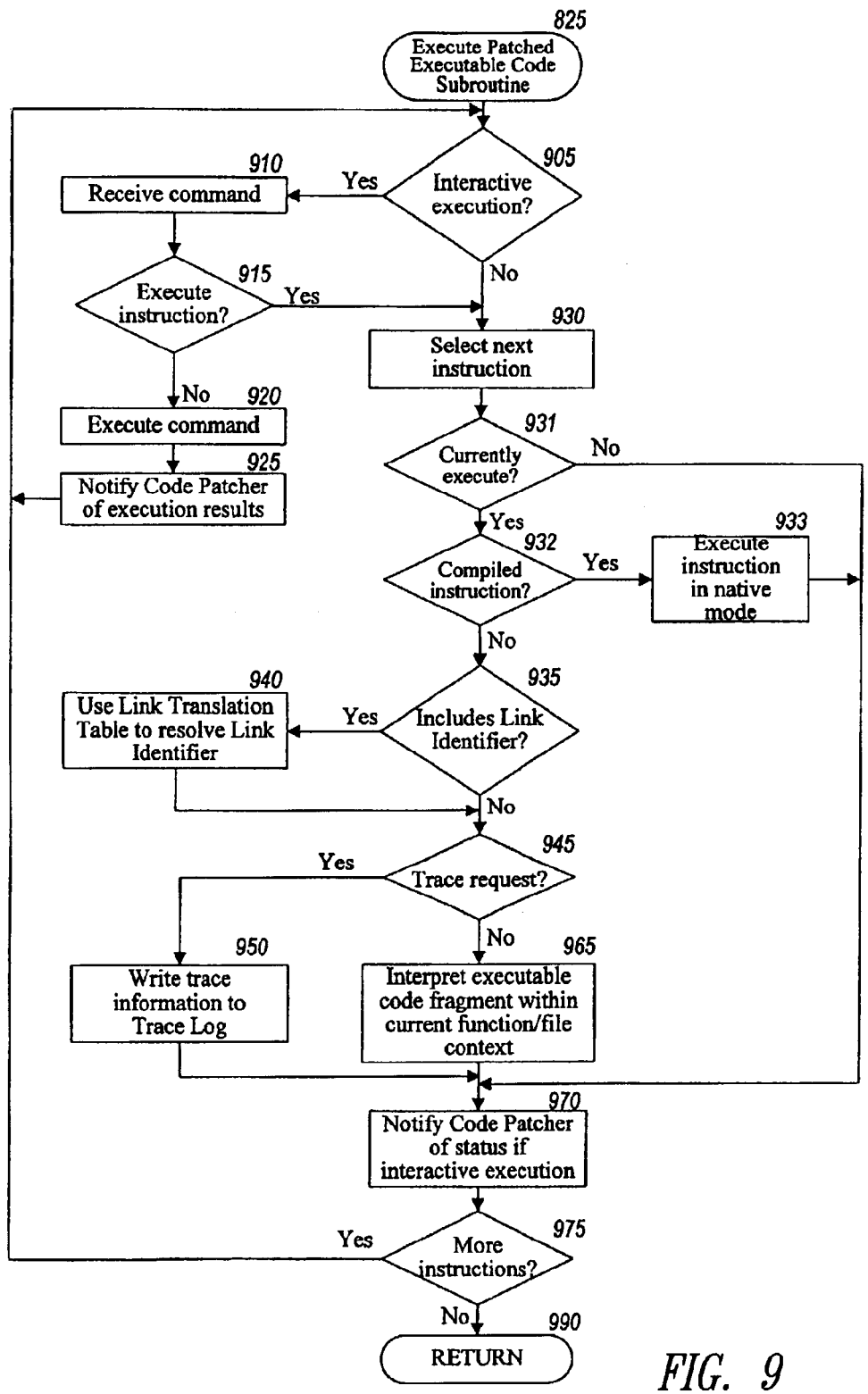
FIG. 9 is an exemplary flow diagram of an embodiment of the Execute Patched Executable Code subroutine.

FIG. 9 is an exemplary flow diagram of an embodiment of the Execute Patched Executable Code subroutine 825. The Execute Patched Executable Code subroutine receives and executes user commands if an interactive execution of the patched compiled executable code file is in process. When a non-patched compiled instruction is to be executed, it is executed as native code. For each patch statement, the subroutine first determines if the statement is to be executed and then resolves link identifiers if necessary. The subroutine then satisfies trace requests by writing the specified trace information to a trace log on the target system, executes code fragment executables by interpreting them, and notifies the Code Patcher system 133 of the execution status after the instruction has been processed.

The subroutine begins at step 905 where it is determined if the current execution of the patched compiled executable code file is to be done in an interactive mode. If so, the routine continues in step 910 to receive a user command. The subroutine then continues to step 915 to determine if the received command is to execute the current instruction in the patched executable code file. If not, the subroutine continues to step 920 to execute the user command, and then continues to step 925 to notify the Code Patcher system 133 of the results of executing the command. For example, a user may wish to see a current value for a variable or to specify a break point at a spot in the patched compiled executable code file. After such a break point has been set, the user may indicate to continue execution in a non-interactive mode until a break point is reached, thus causing execution to stop and returning execution of the patched executable code file to an interactive mode. After step 925, the subroutine returns to step 905.

If it was instead determined in step 905 that the execution of the patched executable code file is not currently in interactive mode, or if it was determined in step 915 that the user command was to execute the current instruction, the subroutine continues in step 930 to select the next instruction in the patched executable code file, beginning with the first instruction. The subroutine then continues to step 931 to determine whether the current instruction is to be currently executed. For example, the current instruction could be a patching instruction for a patch that is disabled or that is qualified with a condition that is not currently met in the current environment. If the instruction is not to be currently executed, the subroutine continues to step 970 where the Code Patcher system 133 will be notified of the status of execution of the current instruction if execution is occurring in an interactive mode. Those skilled in the art will appreciate that when an entire patch handler consisting of multiple patch statements has been disabled or is not qualified, the status of the patch handler can be indicated in a variety of ways. For example, a flag could be set when the patch handler was entered indicating that patch statements are not to be currently executed while the flag is set, with the flag being reset when the end of the patch handler is reached. Alternately, the patch handler could cause the flow of execution to skip any disabled patch statements.

If it is determined in step 931 that the current instruction is to be executed, the subroutine continues to step 932 to determine if the instruction is a compiled instruction. If so, the subroutine continues to step 933 to execute the current instruction in native mode on the target system, and then continues to step 970. If it is instead determined in step 932 that the current instruction is a non-compiled patch statement or patching instruction, the subroutine continues in step 935 to determine if the current instruction includes a link identifier reference that needs to be resolved. If so, the subroutine continues in step 940 to use the Link Translation Table to resolve the link identifier so that the current position in memory for the associated code can be accessed. After step 940, or if it is determined in step 935 that a link identifier is not present, the subroutine continues in step 945 to determine if the current instruction is a trace request. If so, the subroutine continues to step 950 to write the specified trace information to a trace log on the target system that can be retrieved by a user on the host computer system 100. If the trace request includes variable or expressions to be evaluated, they will be evaluated in the context of the current variable scope.

If it is instead determined in step 945 that the current instruction is not a trace request, the subroutine continues to step 965 to execute the code fragment executable by interpreting it within the context of the current variable scope. For example, a global variable X may be defined, with the current flow of execution first entering Function 1 with a variable X that is local to that function and then entering a Function 2 with a distinct local variable X for that function. If patch code within Function 2 requires the evaluation of variable X, its current variable binding within the scope of Function 2 will be used for the evaluation. Those skilled in the art will appreciate that the current variable scope can be determined in a variety of ways, such as by using symbol table information from the patched executable code file or the current variable block on the stack. After step 950 or 965, the subroutine continues at step 970 to notify the Code Patcher system 133 of the status of executing the current instruction if execution is occurring in interactive mode. The subroutine then continues to step 975 to determine if there are more instructions to be executed in the patched compiled executable code file. If so, the subroutine returns to step 905, and if not the subroutine returns in step 990.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for modifying an executable file including a plurality of compiled instructions, the compiled instructions natively executable on a target computer but not on a source computer, the modifying performed under control of the source computer without recompiling or relinking or rewriting the executable file, the method comprising:

under control of the source computer,
(a) loading the executable file onto the target computer;
(b) receiving a plurality of indications to modify the loaded executable file, each indication specifying one of the compiled instructions in the loaded executable file and at least one non-compiled executable instruction to be added to the loaded executable file;
(c) modifying the loaded executable file by, for each indication,
creating an instruction group including the specified at least one non-compiled executable instruction;
converting the instruction group into an executable non-compiled format not specific to the target computer; and
replacing the specified compiled instruction in the loaded executable file with an executable patch instruction associated with the converted instruction group, the patch instruction when executed to transfer flow of execution to the converted instruction group with which the patch instruction is associated; and
(d) loading the converted instruction groups into at least one memory area on the target computer, the at least one memory area distinct from a memory area on the target computer containing the loaded executable file; and under control of the target computer, executing the modified loaded executable file by, as the flow of execution sequentially reaches each executable instruction,
(e) when the executable instruction is a non-compiled executable instruction from an instruction group, interpretively evaluating the executable instruction;
(f) when the executable instruction is a patch instruction, transferring flow of execution to the loaded associated converted instruction group; and
(g) when the executable instruction is a compiled instruction, natively executing the compiled executable instruction, so that additional functionality is exhibited when the modified loaded executable file is executed on the target computer.

2. The method of claim 1 wherein at least one of the non-compiled executable instructions is a trace instruction specifying information related to execution of the loaded executable file, and wherein when the flow of execution reaches the trace instruction a current state of the specified information is made available to the source computer.

3. The method of claim 2 wherein at least one of the instruction groups includes the specified compiled instruction that was replaced with the patch instruction associated with that instruction group.

4. The method of claim 1 wherein when multiple indications specify a single compiled instruction a single instruction group is created for the multiple indications, the single instruction group including the non-compiled executable instructions specified by each of the multiple indications.

5. The method of claim 1 wherein the patch instructions are transfer statements.

6. The method of claim 1 wherein the executable non-compiled format is a parse tree.

7. The method of claim 1 wherein when a non-compiled executable instruction is interpretively evaluated, references to variables are resolved using a current variable scope created by compiled instructions.

8. The method of claim 1 wherein after performing steps (a)–(g) a first time, steps (b)–(g) are performed a second time without performing step (a) a second time such that the modified loaded executable file is further modified and then executed without reloading the executable file.

9. A method for modifying a compiled file loaded on a target computer, the loaded compiled file including a plurality of instructions executable on the target computer, the method comprising:
   modifying the loaded compiled file by,
      under control of a source computer,
         receiving an indication to modify the loaded compiled file by adding at least one instruction to be executed upon execution of the loaded compiled file;
         creating a patch group including a plurality of instructions,
         the plurality of instructions including the indicated at least one instruction; and
         replacing an instruction in the loaded compiled file with a patch instruction; and
      loading the patch group into a first portion of memory on the target computer distinct from a second portion of memory on the target computer containing the loaded compiled file; and
   on the target computer, executing the instructions in the modified loaded compiled file by, when an instruction to be executed is the patch instruction, indicating one of the plurality of instructions in the loaded patch group as a next instruction to be executed.

10. The method of claim 9 wherein the indicating of the one of the plurality of instructions involves transferring flow of execution to a first instruction in the loaded patch group.

11. The method of claim 10 wherein the plurality of instructions in the compiled file are in a compiled format specific to the target computer, wherein the plurality of instructions in the loaded patch group are in a non-compiled format not specific to the target computer, and wherein when an instruction to be executed is one of the plurality of instructions in the loaded patch group, the instruction is executed by interpreting the instruction.

12. The method of claim 11 wherein the non-compiled format is a parse tree.

13. The method of claim 10 wherein the patch group includes a return instruction that when executed transfers flow of execution back to an instruction in the loaded modified compiled file.

14. The method of claim 10 wherein the patch instruction is a transfer statement.

15. The method of claim 9 wherein the created patch group includes the replaced instruction.

16. The method of claim 9 wherein the indicated at least one of the plurality of instructions of the patch group is a trace instruction specifying information related to the execution of the loaded executable file.

17. The method of claim 16 wherein the when flow of execution reaches trace instruction a current state of the specified information is made available to the source computer.

18. The method of claim 9 wherein the executing of the instructions in the modified loaded compiled file on the target computer is performed under interactive control of the source computer.

19. The method of claim 9 including before the modifying of the loaded compiled file, loading the compiled file into the second portion of memory.

20. The method of claim 19 including after the modifying of the loaded compiled file and the executing of the instructions in the modified loaded compiled file, performing the modifying and the executing again without performing the loading of the compiled file into memory again.

21. The method of claim 9 including:
   halting the executing of the instructions in the modified loaded compiled file before the executing has completed;
   performing the modifying of the loaded compiled file again; and
   continuing the halted executing without restarting execution of the modified loaded compiled file.

22. A computer-implemented method for adding instructions to be executed to an executable compiled file without recompiling or rewriting the file, the method comprising:
   receiving an indication to modify the compiled file, the indication specifying a compiled instruction in the compiled file and at least one executable instruction to be added;
   modifying the compiled file by,
      creating a patch group including the specified at least one executable instruction; and
      replacing the specified compiled instruction in the compiled file with a patch instruction such that flow of execution will transfer to the created patch group upon execution of the patch instruction; and
   storing separate from the patch group the modified compiled file including the patch instruction,
so that instructions in the patch group will be executed when the modified compiled file is later executed.

23. The method of claim 22 wherein the instructions in the patch group are in a non-compiled format such that execution of the instructions involves interpreted evaluation.

24. The method of claim 22 wherein the created patch group includes a return instruction that when executed transfers flow of execution back to an instruction in the modified compiled file.

25. The method of claim 22 wherein the created patch group includes the replaced instruction.

26. The method of claim 22 wherein the specified at least one executable instruction will when executed provide trace information about current execution of the modified file.

27. The method of claim 26 wherein the trace information indicates when the specified compiled instruction is executed.

28. The method of claim 26 wherein the trace information indicates when a function including the specified compiled instruction is invoked.

29. The method of claim 22 wherein a plurality of executable instructions to be added are specified and wherein the created patch group includes a function with multiple instructions, the function invokable by other instructions.

30. The method of claim 22 wherein the modified compiled file is executed on a separate computer, and including:
   supplying to the separate computer at least one direction related to the execution of the modified compiled file; and
   displaying received results of performance of the supplied direction.

31. The method of claim 22 wherein without removing the patch instruction nom the modified compiled file, the patch group is disabled such that the instructions in the patch group are not executed when the modified compiled file is executed.

32. A computer-implemented method for executing a modified compiled file including a plurality of original compiled instructions and at least one patch instruction in place of an original compiled instruction, each patch instruction when executed to transfer flow of execution to an associated patch group including a plurality of instructions, the method comprising:

loading the modified compiled file and the associated patch groups into memory; and executing the modified compiled file by, as the flow of execution reaches each executable instruction, when the executable instruction is an original compiled instruction, natively executing the executable instruction;

when the executable instruction is one of the patch instructions, transferring flow of execution to the associated patch group for the patch instruction; and when the executable instruction is one of the plurality of instructions from a patch group, interpretively evaluating the executable instruction.

33. The method of claim 32 wherein the modified compiled file is loaded into memory on a target computer and wherein the plurality of instructions in the loaded patch groups are in a non-compiled format not specific to the target computer.

34. The method of claim 33 wherein the patch groups are loaded into memory on a source computer distinct from the target computer.

35. The method of claim 32 wherein a location in memory is determined for each patch group when the patch group is to be loaded, wherein the memory location of each loaded patch group is tracked, and wherein when a patch instruction is to be executed, the tracked current memory location of the associated patch group is determined to enable the transferring of the flow of execution.

36. The method of claim 32 wherein before each patch group is loaded into memory, a memory location is predetermined for the patch group and the patch instruction for the patch group indicates the predetermined memory location, the predetermined memory location to be used for the transferring of the flow of execution.

37. The method of claim 32 wherein the plurality of instructions in the loaded patch groups are specified in a non-compiled format.

38. The method of claim 32 wherein when interpretively evaluating instructions from a patch group, variables are evaluated in the context of current variable scopes.

39. The method of claim 32 wherein the executing of the modified compiled file is performed under interactive control of a distinct computer.

40. An embedded systems development application for adding instructions to be executed to an executable compiled file without recompiling or rewriting the file, the application comprising:

a command subsystem on a source computer for receiving indications to modify the compiled file, the compiled file being on an embedded computer, each indication specifying a compiled instruction in the compiled file and at least one executable instruction to be added; and a patching subsystem on the source computer for modifying the compiled file by creating for each received indication an associated patch group including the specified at least one executable instruction, and by replacing the specified compiled instruction in the compiled file with a patch instruction such that flow of execution will transfer to the associated patch group upon execution of the patch instruction.

41. The embedded systems development application of claim 40 including a code fragment executables subsystem on the source computer for converting instructions in the patch group into a noncompiled format such that execution of the instructions involves interpreted evaluation.

42. The embedded systems development application of claim 40 wherein the command subsystem is further for receiving an indication to supply to the embedded computer at least one direction related to the execution of the modified compiled file and for displaying received results of performance of the supplied direction.

43. The embedded systems development application of claim 40 wherein the specified at least one executable instruction will when executed provide trace information about current execution of the modified file.

44. The computer system of claim 40 including a patch interpreter subsystem on the embedded computer for executing the modified compiled file by, as the flow of execution reaches each executable instruction, when the executable instruction is a compiled instruction, natively executing the executable instruction;

when the executable instruction is one of the patch instructions, transferring flow of execution to the associated patch group for the patch instruction; and when the executable instruction is one of the instructions from a patch group, interpretively evaluating the executable instruction.

45. A computer-readable medium containing instructions for controlling a computer system to add instructions to be executed to an executable compiled file without recompiling the file, by:

receiving an indication to modify the compiled file, the indication specifying a compiled instruction in the compiled file and at least one executable instruction to be added; and modifying the compiled file by, creating a patch group including the specified at least one executable instruction; and replacing the specified compiled instruction in the compiled file with a patch instruction such that flow of execution will transfer to the created patch group upon execution of the patch instruction.

46. The computer-readable medium of claim 45 wherein the instructions in the patch group are in a non-compiled format such that execution of the instructions involves interpreted evaluation.

47. The computer-readable medium of claim 45 wherein the modified compiled file is executed on a computer separate from the controlled computer system, and wherein the controlled computer system is further controlled by:

supplying to the separate computer at least one direction related to the execution of the modified compiled file; and displaying received results of performance of the supplied direction.

48. The computer-readable medium of claim 45 wherein the specified at least one executable instruction will when executed provide trace information about current execution of the modified file.

49. The computer-readable medium of claim 45 wherein the computer system is further controlled to execute the modified compiled file by, as the flow of execution reaches each executable instruction, when the executable instruction is a compiled instruction, natively executing the executable instruction;

when the executable instruction is one of the patch instructions, transferring flow of execution to the associated patch group for the patch instruction; and when the executable instruction is one of the instructions from a patch group, interpretively evaluating the executable instruction.

50. The computer-readable medium of claim 45 wherein the computer system is further controlled by, before the modifying of the compiled file, loading the compiled file into memory of a second computer system, and wherein the modifying of the compiled file modifies the loaded compiled file such that the specified compiled instruction is replaced in the loaded compiled file.

51. The computer-readable medium of claim 45 wherein the computer system is further controlled by, after the modifying of the compiled file executing on a target computer the modified compiled file by, when an instruction to be executed is the patch instruction, indicating an instruction in the created patch group as a next instruction to be executed.

52. The computer-readable medium of claim 51 wherein the computer system is further controlled by, after the executing of the modified compiled file, performing the modifying and the executing again without reloading the compiled file into memory.

53. A method for modifying an executable image in a computer system after the executable image is loaded and relocated, the executable image including a plurality of instructions executable on a target computer within the computer system and having a source code representation of at least part of the executable image, the source code representation including a plurality of source code locations associated with sets of instructions in the executable image, the method comprising:
(a) receiving an indication to modify a behavior associated with a specified source code location in the source code representation;
(b) creating a patch instruction in response to the indication to modify a behavior associated with the specified source code location;
(c) mapping the specified source code location to the associated set of instructions in the loaded, relocated executable image; and
(d) replacing at least one of the associated set of instructions in the loaded, relocated executable image with the patch instruction.

54. The method of claim 53, in which the specified source code location is a source code line number.

55. The method of claim 53, in which the specified source code location is a function name.

56. The method of claim 53, in which the patch instruction is a jump instruction.

57. The method of claim 53, in which the patch instruction is a call instruction.

58. The method of claim 53, in which the patch instruction is a jump-to-subroutine instruction.

59. The method of claim 53, further comprising creating a patch group of instructions in response to the indication to modify a behavior associated with the specified source code location.

60. The method of claim 59, in which the patch instruction is a trap instruction which when executed will cause execution to continue with a handler, said handler including instructions which will cause execution to continue with at least one instruction in said patch group.

61. The method of claim 59, in which the patch instruction is a breakpoint instruction which when executed will cause execution to continue with a handler, said handler including instructions which will cause execution to continue with at least one instruction in said patch group.

62. The method of claim 59, in which the patch instruction is a software exception instruction which when executed will cause execution to continue with a handler, said handler including instructions which will cause execution to continue with at least one instruction in said patch group.

63. The method of claim 59, in which the patch instruction is a system call instruction which when executed will cause execution to continue with a handler, said handler including instructions which will cause execution to continue with at least one instruction in said patch group.

64. The method of claim 59, in which said patch group executes in the same execution context as said patch instruction.

65. The method of claim 59, in which said patch group includes instructions which simulate a behavior of the replaced instruction.

66. The method of claim 65, in which the received indication includes an indication to add additional behavior to a behavior associated with a specified source code location.

67. The method of claim 59, in which the patch group of instructions includes an instruction to write an identifier associated with the specified source code location to an address.

68. The method of claim 59, further including the step of mapping at least one of a named variable, parameter or constant to an address, wherein the patch group of instructions includes an instruction to access the mapped address of the at least one of a named variable, parameter or constant.

69. The method of claim 68, wherein the instruction to access the mapped address of the at least one of a named variable, parameter or constant is a call instruction.

70. The method of claim 68, wherein the patch group of instructions includes an instruction to evaluate an expression containing at least one of a named variable, parameter or constant.

71. The method of claim 59, wherein the patch group of instructions comprises a parse tree.

72. The method of claim 53, wherein the received indication is received interactively.

73. The method of claim 53, further comprising the steps of:
(a) receiving a subsequent indication to modify a behavior associated with a specified source code location in the source code representation;
(b) creating a subsequent patch instruction in response to the subsequent indication to modify a behavior associated with a specified source code location;
(c) mapping the specified source code location to the associated set of instructions in the loaded, relocated executable image; and
(d) replacing at least one of the associated set of instructions in the loaded, relocated executable image with the patch instruction.

74. The method of claim 53, further comprising storing the received indication.

75. A computer system including a target computer and a source computer, the system for modifying compiled files on an embedded computer, the system comprising:
a command subsystem on the source computer, the command subsystem for receiving commands to patch a compiled executable file on the target computer by replacing an executable instruction in the compiled executable file with a patching instruction pointing to a patch handler stored in a memory location distinct from the compiled executable file, the command subsystem further for receiving commands to execute one or more patch handlers in a patch group, the command subsystem further for receiving commands to add trace requests to the compiled executable file on the target computer;
a patch interpreter subsystem on the target computer, the patch interpreter subsystem for interpretively evaluating patch statements stored in a non-natively-executable format on the target computer.

* * * * *